US010779238B2

(12) United States Patent
Lang et al.

(10) Patent No.: US 10,779,238 B2
(45) Date of Patent: Sep. 15, 2020

(54) ACCESS CONTROL SYSTEM WITH DYNAMIC PERFORMANCE TUNING

(71) Applicant: Carrier Corporation, Palm Beach Gardens, FL (US)

(72) Inventors: Michael Lang, Oregon City, OR (US); Adam Purdue, Salem, OR (US); Adam Kuenzi, Silverton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/489,747

(22) PCT Filed: Feb. 12, 2018

(86) PCT No.: PCT/US2018/017761

§ 371 (c)(1),
(2) Date: Aug. 29, 2019

(87) PCT Pub. No.: WO2018/160343

PCT Pub. Date: Sep. 7, 2018

(65) Prior Publication Data

US 2019/0387473 A1 Dec. 19, 2019

Related U.S. Application Data

(60) Provisional application No. 62/465,980, filed on Mar. 2, 2017.

(51) Int. Cl.

*H04W 52/02* (2009.01)
*G07C 9/00* (2020.01)

(52) U.S. Cl.

CPC .... *H04W 52/0245* (2013.01); *G07C 9/00309* (2013.01); *H04W 52/0229* (2013.01); *G07C 2009/00634* (2013.01); *G07C 2009/00793* (2013.01)

(58) Field of Classification Search

CPC .......... H04W 52/0245; H04W 52/0229; G07C 9/00309

See application file for complete search history.

(56) References Cited

U.S. PATENT DOCUMENTS 6,950,645 B1 9/2005 Kammer et al.
7,230,933 B2 6/2007 Bahl et al.
7,653,017 B2 1/2010 Huylebroeck
7,680,520 B2 3/2010 Ruuska et al.
(Continued)

FOREIGN PATENT DOCUMENTS

CN 104581646 A 4/2015
KR 100881223 B1 2/2009
(Continued)

OTHER PUBLICATIONS http://www.cs.toronto.edu/~catalin/ut-thesis.pdf.
International Search Report dated May 8, 2018 for PCT/US2018/017761.

*Primary Examiner* — David Bilodeau
(74) *Attorney, Agent, or Firm* — Bachman & LaPointe, P.C.

(57) ABSTRACT

A method of dynamically changing a mode of advertising for at least one of a multiple of access controls, including transmitting advertisements from an access control at a nominal mode; and changing the nominal mode in response to an event.

16 Claims, 7 Drawing Sheets

(56) References Cited

U.S. PATENT DOCUMENTS

| | | | | |
|---|---|---|---|---|
| 7,693,485 | B2 | 4/2010 | Parys | |
| 8,073,388 | B2 | 12/2011 | Grushkevich et al. | |
| 8,213,864 | B1 | 7/2012 | Zhodzishsky et al. | |
| 8,780,881 | B2 | 7/2014 | Venkatachalam et al. | |
| 8,971,807 | B2 | 3/2015 | Hillyard | |
| 9,462,623 | B2 | 10/2016 | Jakusovszky et al. | |
| 9,483,887 | B1 * | 11/2016 | Soleimani | G07C 9/00007 |
| 9,503,969 | B1 | 11/2016 | Zakaria | |
| 10,015,653 | B2 | 7/2018 | Lang et al. | |
| 10,182,336 | B1 * | 1/2019 | Stockton | A61N 1/37252 |
| 2007/0047506 | A1 | 3/2007 | Froehling et al. | |
| 2014/0094123 | A1 * | 4/2014 | Polo | H04W 52/0216 455/41.2 |
| 2015/0235486 | A1 * | 8/2015 | Ellis | G07C 9/00309 340/5.61 |
| 2016/0066137 | A1 * | 3/2016 | Kulkarni | G01S 3/28 455/456.1 |
| 2016/0165387 | A1 | 6/2016 | Nhu | |
| 2017/0295453 | A1 * | 10/2017 | Mahasenan | H04W 8/005 |
| 2017/0312530 | A1 * | 11/2017 | Schilling | H04L 67/125 |

FOREIGN PATENT DOCUMENTS

| | | | |
|---|---|---|---|
| WO | 2015191190 | A1 | 12/2015 |
| WO | 2016089846 | A1 | 6/2016 |

* cited by examiner

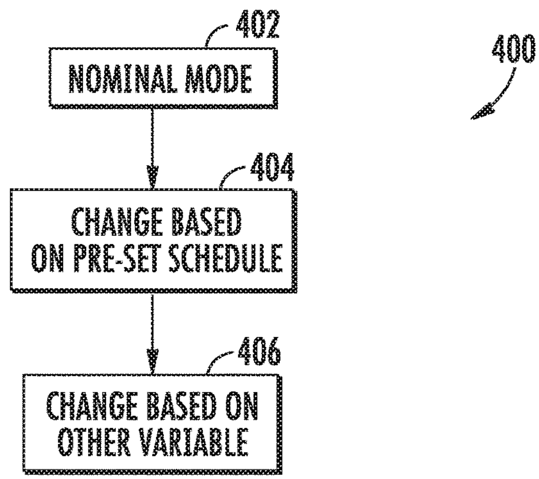
FIG. 4
| MODE | RATE | BATTERY LIFE |
| --- | --- | --- |
| NOMINAL | 1/SEC | 2.5 YEARS |
| FOUR TIMES AS FAST | 4/SEC | 1.6 YEARS |
| HALF AS FAST | 1 EVERY 2 SECONDS | 2.8 YEARS |
| 4 HOUR AT 4X, 4 HOURS AT NOMINAL, 16 HOURS AT HALF | DYNAMIC PERFORMANCE | 2.55 YEARS (BETTER THAN NOMINAL WITH PERIODS OF BETTER PERFORMANCE) |
FIG. 5
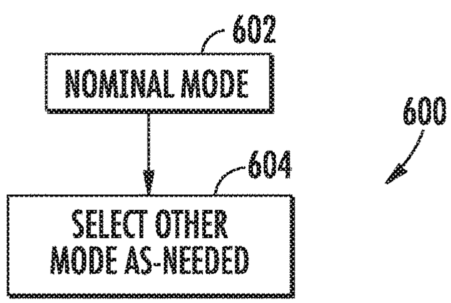
FIG. 6

| MODE | RATE |
|---|---|
| NOMINAL "SLOW" | 1 EVERY 5 SEC. |
| MEDIUM | 1 EVERY SEC. |
| FAST | 32/SEC |

ACCESS CONTROL SYSTEM WITH DYNAMIC PERFORMANCE TUNING

BACKGROUND

The present disclosure relates generally to access control systems, and more particularly, to a system and a method to increase performance without decreasing battery life.

Various mobile devices have been utilized to open locks via an infrared 'beam' to the lock, which provides directionality, or a 'push the button' on the box to wake up the lock for subsequent communication over Bluetooth. With the capability present in Bluetooth Low Energy (BTLE) to communicate with very low power, new system architectures allow the lock to be 'always on' and sending periodic BTLE advertisements, such as once per second so that the lock may be opened without requiring a wake up procedure. The low power requirements result in many years of battery life.

Adding BTLE always on capability to a lock in addition to physical card readers reduces the overall battery life. Additionally, in order to minimize the impact on the battery life, the advertisement rate for a BTLE device must be slowed down to a point to where the operational current draw is acceptable for a given battery life expectancy (i.e. 2 years). The rate at which a connectable device sends BTLE advertisements directly affects the amount of time required to connect to the device because after a person indicates intent to open a lock with their mobile device, the mobile device must wait for the next advertisement before connecting to the device. This leads to a trade-off in performance for how fast the lock opens versus battery life.

SUMMARY

A method of dynamically changing a mode of advertising for at least one of a multiple of access controls according to one disclosed non-limiting embodiment of the present disclosure can include transmitting advertisements from an access control according to a nominal mode; and changing the nominal mode in response to an event.

A further embodiment of the present disclosure may include changing the nominal mode in response to the pre-set schedule includes changing the advertisement rate.

A further embodiment of the present disclosure may include the event is based on a scan request.

A further embodiment of the present disclosure may include changing the nominal mode in response to the event includes changing the nominal mode to a slower mode or a faster mode for a period of time in response to the event.

A further embodiment of the present disclosure may include the event is based on a scan request and a comparison between an RSSI value and a threshold value.

A further embodiment of the present disclosure may include changing the nominal mode in response to the event includes changing the nominal mode to a slower mode or a faster mode for a predefined period of time.

A further embodiment of the present disclosure may include reverting to the nominal rate after a time period subsequent to the event.

A further embodiment of the present disclosure may include reverting to the nominal rate after an access control unlock event.

A further embodiment of the present disclosure may include changing to a medium rate between the nominal rate and a fast rate after a time period subsequent to the event, prior to reverting to the nominal rate after a time period subsequent to the event.

A further embodiment of the present disclosure may include reverting to the nominal rate after a low battery event.

A further embodiment of the present disclosure may include reverting to the medium or nominal rate after comparing a calculation of average power consumption with a threshold.

A method of dynamically changing a mode of advertising for at least one of a multiple of access controls according to one disclosed non-limiting embodiment of the present disclosure includes transmitting advertisements from an access control according to a nominal mode; changing the nominal mode in response to an event; and changing to a medium rate between the nominal rate and a fast rate after a time period subsequent to the event, prior to reverting to the nominal rate after a time period subsequent to the event.

A further embodiment of the present disclosure includes, wherein the event is based on a scan request.

A further embodiment of the present disclosure includes, wherein changing the nominal mode in response to the event includes changing the nominal mode to a slower mode or a faster mode for a predetermined period of time in response to the event.

A further embodiment of the present disclosure includes, wherein the event is based on a scan request and a comparison between an RSSI value and a threshold value.

A further embodiment of the present disclosure includes, monitoring an average RSSI values of the scan responses such that a medium mode is switched to if the average RSSI is greater than a minimum value.

An access control system according to one disclosed non-limiting embodiment of the present disclosure includes an access control operable to transmit advertisements at a nominal rate and at least one other rate different than the nominal rate.

A further embodiment of the present disclosure includes, wherein the rate is selected in response to a dynamic schedule.

A further embodiment of the present disclosure includes, wherein the rate is selected in response to an event.

A further embodiment of the present disclosure includes, wherein the advertisements using Bluetooth low energy (BTLE) that is receivable by a mobile device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a flowchart of a method to dynamically change a mode of advertising according to one disclosed non-limiting embodiment;

FIG. 5 is a chart comparing example modes of advertising;

FIG. 6 is a flowchart of a method to dynamically change a mode of advertising according to one disclosed non-limiting embodiment.

DETAILED DESCRIPTION

Figure 1:
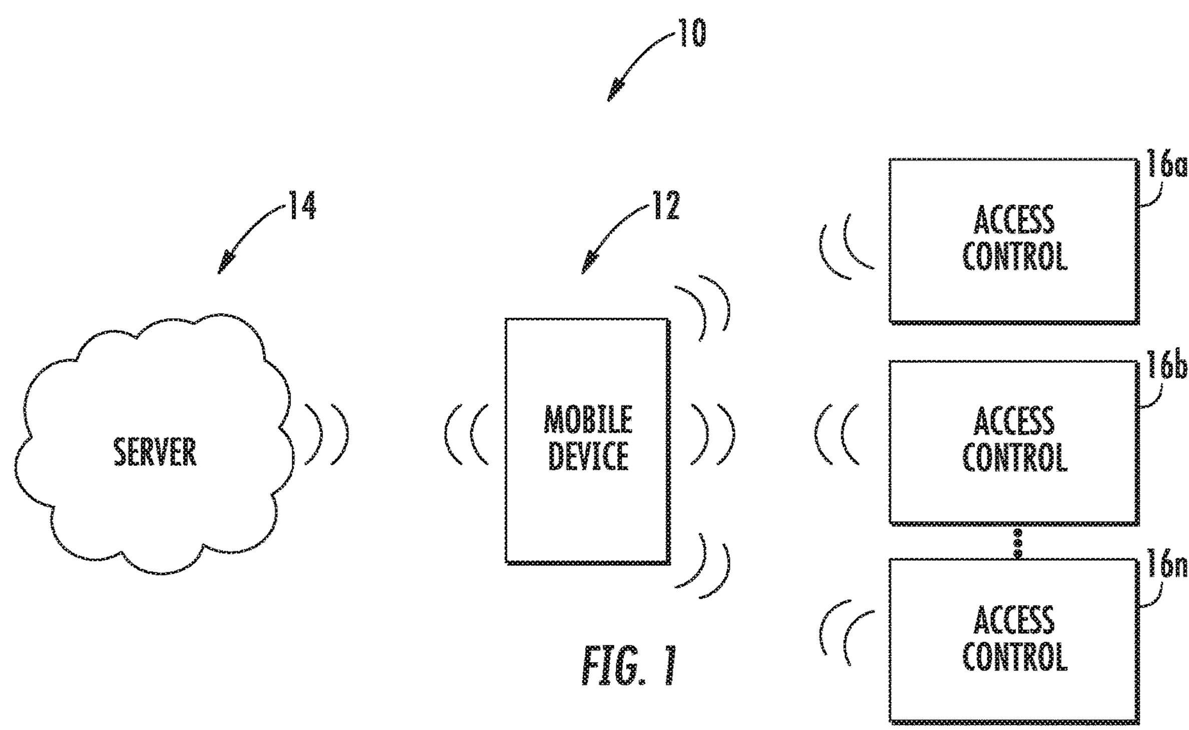
FIG. 1 is a general schematic system diagram of an access control system.

FIG. 1 schematically illustrates an access control system 10. The system 10 generally includes a mobile device 12, a server 14, and a plurality of access controls 16, schematically illustrated as 16*a*, 16*b*, . . . , 16*n*. It should be appreciated that, although particular systems are separately defined in the schematic block diagrams, each or any of the systems may be otherwise combined or separated via hardware and/or software.

The mobile device 12 is a wireless capable handheld device such as a smartphone, which is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
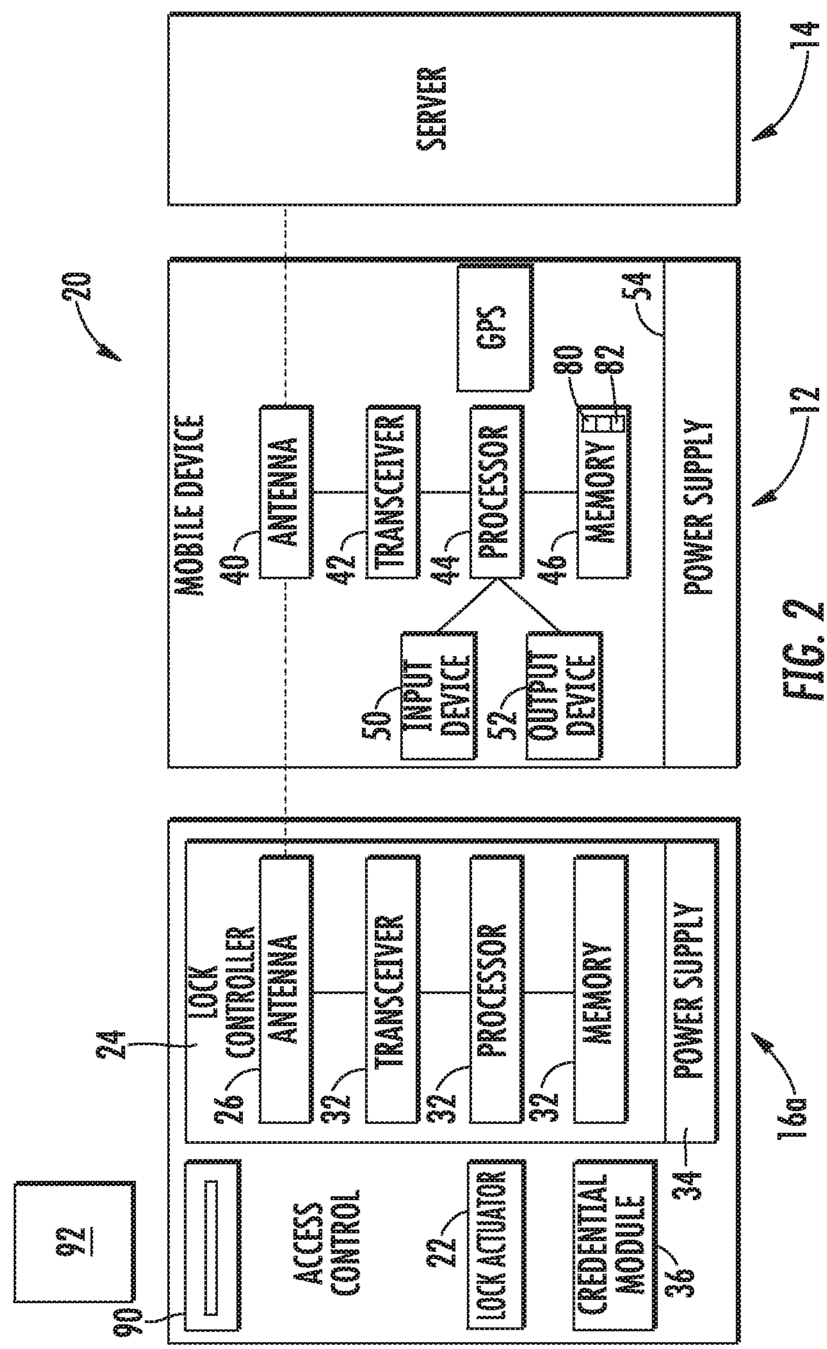
FIG. 2 is a block diagram of the access control system.

With reference to FIG. 2, a block diagram of an example electronic lock system 20 includes the access control 16*a*, the mobile device 12, and the server 14. The access control 16*a* generally includes a lock actuator 22, a lock controller 24, a lock antenna 26, a lock transceiver 28, a lock processor 30, a lock memory 32, a lock power supply 34, a lock card reader 90 and a credential module 36. The access control 16*a* is responsive to credentials from the mobile device 12, and may, for example, be the lock of a lockbox, a door lock, or a lock core. Although the present disclosure focuses primarily on access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16*a* has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16*a*. This is the online configuration and in this embodiment a mobile credential is retrieved in real time and is passed to the credential module 36 without storing first in the key memory 46 on the mobile device 12.

Figure 3:
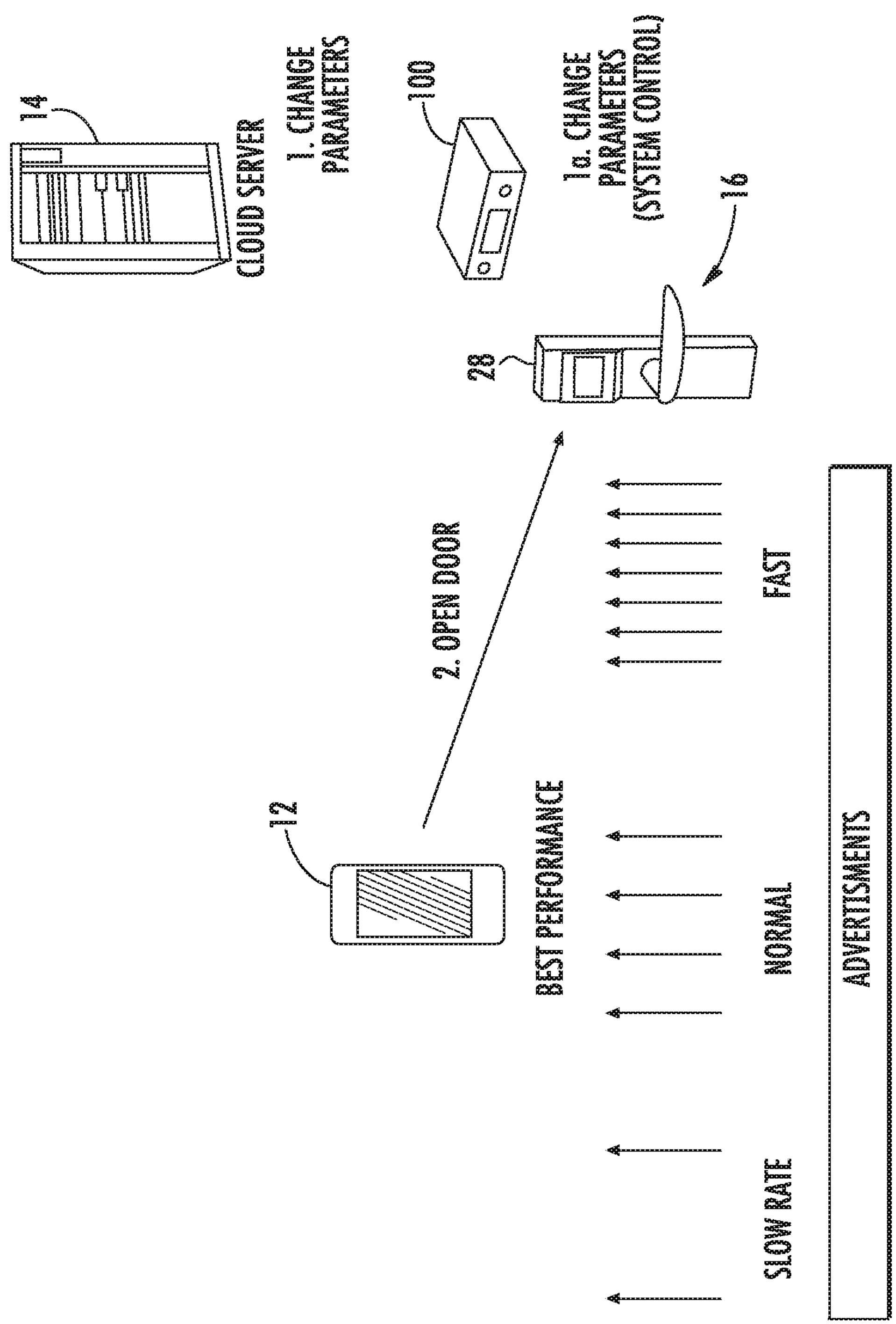
FIG. 3 is a block diagram of the access control system in which a mode of advertising is dynamically changed.

With reference to FIG. 3 and FIG. 4, each access control 16 advertises using, for example, Bluetooth low energy (BTLE) which is received by the mobile device 12 (step 402). Advertisements from multiple access controls 16 can be received because they are all in proximity to the mobile device 12, or they are transmitting at a high enough power that they are within a distance from the mobile device 12 to be received.

Each of the multiple of access controls 16 dynamically changes its advertising performance in response to the server 14 and/or the lock controller 24. That is, the mode of advertising is dynamically changed, i.e. the advertising rate, transmit power, etc., over time such that an overall average power consumption provides for longer battery life, while also providing for peak time periods where the lock performance is increased to facilitate higher user satisfaction.

With reference to FIG. 4, in one embodiment, the access control system 10 dynamically changes the mode of advertising for at least one of the multiple of access controls 16 in response to a pre-set schedule. A method 400 of advertisement follows a pre-set schedule for self-modifying the performance dynamically. Initially, a nominal advertisement rate mode is set as a default (step 402). The nominal advertisement rate mode may be, for example, one (1) advertisement per second that results in a 2.5 year battery life (FIG. 5).

Then, in response to a pre-set schedule based on, for example, the time of day, the day of the week, and other temporal metrics, the nominal advertisement rate may be changed (step 404) to a faster rate such as four (4) advertisements per second, which may be beneficial for lock open response times during check-in times of the day (e.g. 3 pm-5 pm), or to a slower rate such as one (1) advertisements every two (2) second, which may be beneficial during the night for overall lower use of the energy from the batteries 34 in the lock 16. The result may be an overall better battery life than nominal, for example 2.55 years (FIG. 5), because of energy saved in the batteries 34 during times of slower advertising as compared to additional energy used during times of optimal performance. Other variables such as room occupied/not occupied, i.e. when deadbolt is thrown or there is a recent door open/closed event may further facilitate selection of a particular mode (step 406). That is, a look-up table or other reference may be used by the lock processor 30 along with a time component to dynamically change the mode of advertising based on the time or based on other variables that can override the time schedule. Overriding the time schedule can be for a time period based on a configured amount of time after an event. Or the override can persist indefinitely while the access control 16 is in a particular state. An example of another variable where the access control 16 is in a particular state is when a lock 16 deadbolt is closed, the advertising rate can be slower because there is no expectation of being able to open the lock 16 while the deadbolt is closed which benefits to saving energy and a longer battery life. When the deadbolt returns to an open state, the regular schedule can be resumed.

For an alternate, non-limiting example of an override by an event, if a lock 16 is actuated once, there is some probability that it may be opened again in a short period of time, so for a short time period the advertising rate may be faster after a door open event to benefit how quickly subsequent lock openings can be made. After some amount of time the schedule may be resumed. The example given is a non-limiting example of an event and there are other access control system 10 events that may be used to dynamically adjust the mode.

With reference to FIG. 6, in another embodiment, the access control system 10 includes an adjustable mode of advertising for at least one of the multiple access controls 16. A method 600 of advertisement includes an adjustable schedule for an associated access control 16. For example, a remote device 100 (FIG. 3) such as a set-top box, a thermostat, a controller mounted nearby, and/or a gateway type device connects to an associated access control 16 to adjust the mode or schedule of advertising from a nominal mode (step 602) on an as-needed or on-going basis (step 604). The nominal mode (step 602) is when the access control 16 is advertising at a nominal or average rate that normally achieves a desired battery life but may not achieve the desired fastest operation time, for example unlocking a door. The method 600 facilitates a cloud-based schedule that can be adjusted dynamically to optimize for, for example, guest behavior, building occupancy, etc.

One non-limiting example of method 600 using guest behavior, or more generally users of mobile device 12 behavior, to dynamically adjust the schedule may include the location of the user relative to access control 16 as determined by the current location of the mobile device 12 or as determined by the access control system 10. For example, if the mobile device 12 is known to be in a proximity to the access control 16, the nominal mode can be changed to a faster rate while the mobile device 12 is nearby. Knowing the location of the mobile device 12 can be determined by indoor location technologies or other well-known technologies in the art of identifying the position of a mobile device inside or outside a building. The position of the mobile device 12 can be sent to the server 14 or remote device 100 or both so that the schedule can be dynamically changed (step 604). When the mobile device 12 is no longer nearby the access control 16, then the schedule may be set to a slower mode to conserve battery life. In addition to the location of the mobile device 12 relative to the access control 16, positioning technologies can be used to determine whether the mobile device 12 is moving closer or farther away. This can be further used to determine that a person with a mobile device 12 is getting close and will be getting closer to an access control and triggering method 600 to dynamically change the mode so that when they arrive at the access control it is already operating at a faster rate. This method may also be used when, for example, the mobile device 12 is not yet within Bluetooth range of the access control 16.

Another non-limiting example of method 600 using other variables such as room reservation, check-in times, check-out times, and/or special events to dynamically adjust the schedule may include selection of a desired mode or re-configuration of a pre-programmed schedule stored in lock memory 32. For example, when a hotel guest checks-in to their room, this event may be registered by server 14 and either sent to remote device 100 or an adjustment request is sent to remote device 100 so that the schedule can be dynamically changed (step 604) before the hotel guest arrives so that the adjusted schedule optimizes for guest performance when using their mobile device 12 with the lock 16. After a room has been vacated, and is no longer occupied, then a nominal schedule can be set back into the access control 16 by the remote device 100 where the adjusted schedule conserves more battery life. Dynamic scheduling facilitates an optimized interaction between the user of the mobile device 12 and the access control 16 while also optimizing for conserving energy in batteries 34 for as long of a battery life as possible.

Figures 7, 8:
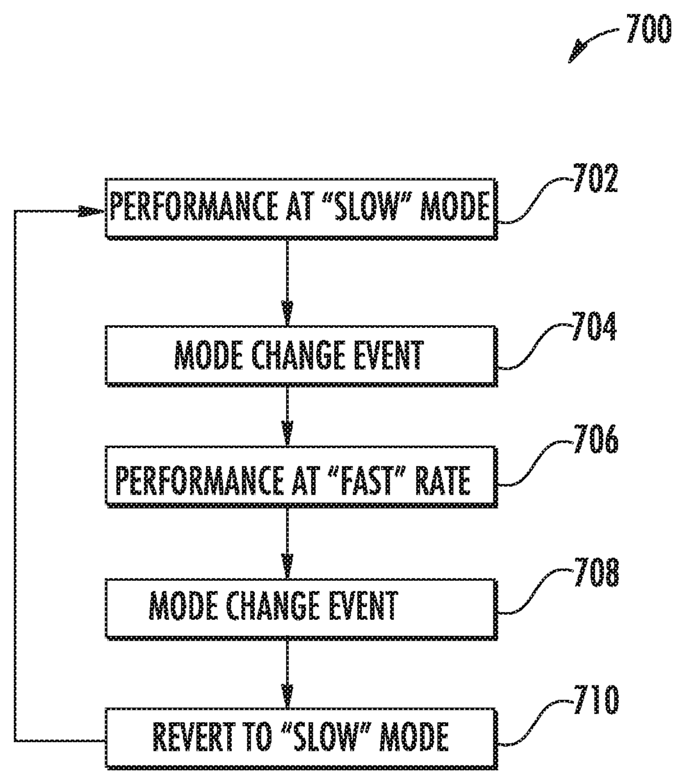
FIG. 7 is a flowchart of a method to dynamically change a mode of advertising according to one disclosed non-limiting embodiment.
FIG. 8 is a chart comparing example modes of performance.

With reference to FIG. 7, in another embodiment, the adjustable mode of advertising for at least one of the multiple access controls 16 includes a method 700 to dynamically change the mode of advertising from a nominal mode (step 702) which, in this embodiment, is a relatively slow advertising rate mode of, for example, once every 5 seconds (FIG. 8).

Figure 9:
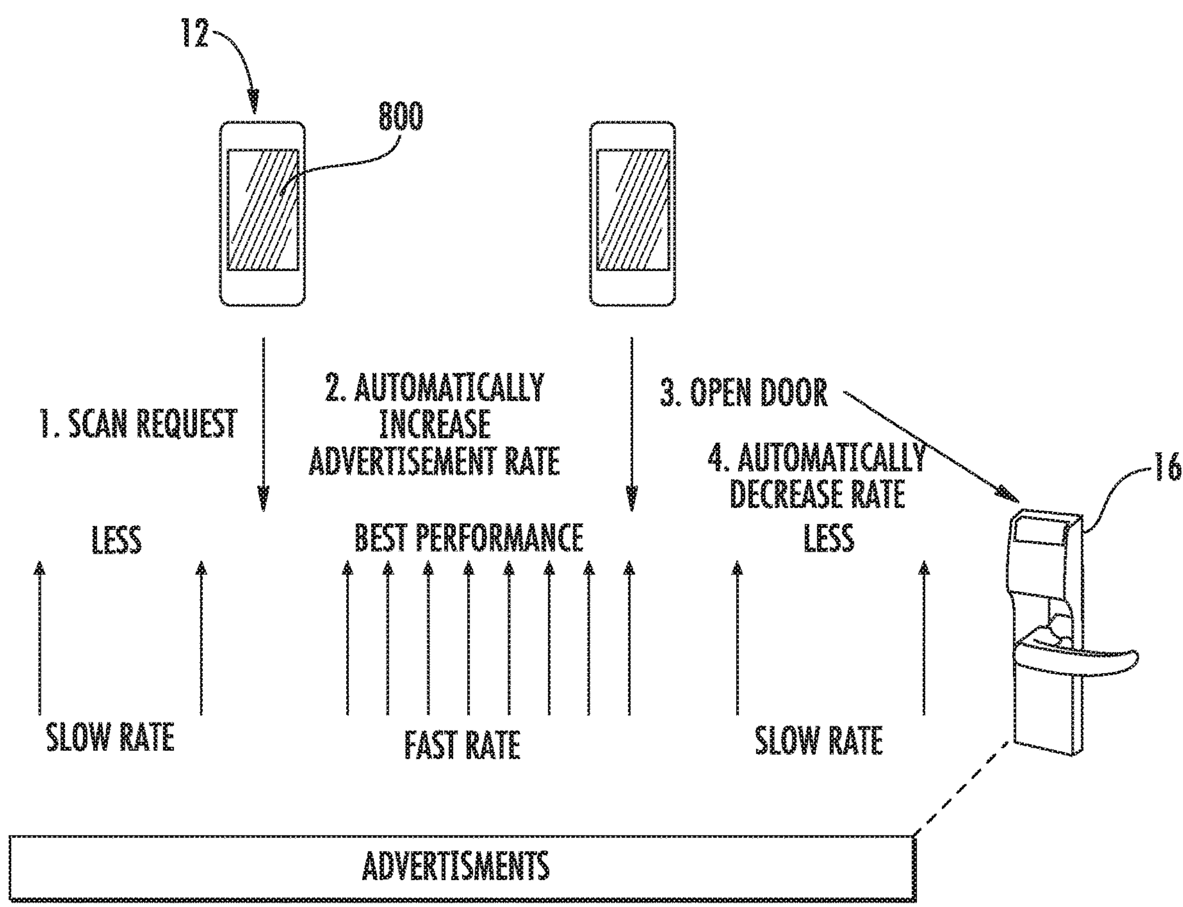
FIG. 9 is a general schematic system diagram of an access control system.

In response to a mode change event (step 704), the access control 16 changes from the nominal mode to a fast mode (step 706). The mode change event, in one example, may be that the mobile device 12 moves within a predetermined distance of the particular access control 16 and is operating a particular lock application 800 (FIG. 9). The lock application 800 is software downloaded to the mobile device 12 that is utilized to operate the access controls 16. The lock application 800 may cause the mobile device 12 to scan for nearby access controls 16 using Bluetooth low energy. Part of the Bluetooth standard for scanning is the capability to request additional information from devices such as the access controls 16 that are advertising. This is a scan request and, in this case, an access control 16, responds with a scan response. A scan request and response exchange do not require an active connection. Additionally, the scan request and response may be implemented as part of the Bluetooth stack on both the mobile device 12 and the access control 16 and so are usually not noticed by a user of the mobile device 12. The information transmitted in the scan response is usually the friendly name of the device. The mode change event may be in response to a scan request, where the existence of a scan request indicates that a mobile device 12 is nearby and within a distance to communicate over Bluetooth to the access control 16. Further, based on receiving the scan request, a mode change event (step 704) can cause the accss control 16 to change to a fast mode (step 706). In this embodiment, the relatively fast advertising rate mode of, for example, 32 times a second (FIG. 8). It should be appreciated that relatively terms such as “nominal,” “fast,” “slow,” etc., may be defined by various characteristics and are utilized herein with respect to one another and are not otherwise limiting.

Next, in response to a second mode change event (step 708), the access control 16 changes from the fast mode to the slow mode (step 710). In this embodiment, the second mode change event may include, but not be limited to, a timeout period, and/or an access control 16 open event. For example, should no unlock event occur with a predetermined time period, such as 30 seconds, the access control 16 reverts to the slow mode to maintain low power requirements that result in many years of battery life but assures rapid response to an unlock event. When standing at the door and starting the operation, the time lost doing the initial scan would be regained on average by the faster time to connect and unlock. In the scenario where the user starts scanning while walking down the hall, the time to unlock when the door is reached would be faster.

Figure 10:
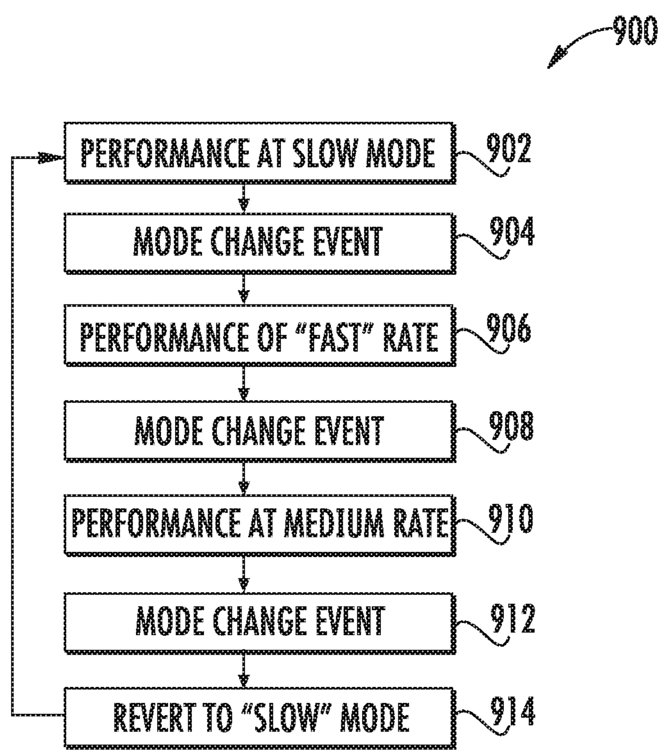
FIG. 10 is a flowchart of a method to dynamically change a mode of advertising according to one disclosed non-limiting embodiment.

With reference to FIG. 10, in another embodiment, the adjustable mode of advertising for at least one of the multiple access controls 16 includes a method 900 to dynamically change the mode of advertising from a nominal mode (step 902) which, in this embodiment, is a relatively slow advertising rate mode of, for example, once every 5 seconds.

In response to a mode change event (step 904), the access control 16 changes from the nominal mode to a fast mode (step 906). The mode change even, in one example, may occur when the scan request/response has an received signal strength indicator (RSSI) value compared to a threshold that the mobile device 12 and the access control 16 are within a predetermined value, i.e., they are close/far/within a predetermined range/etc.

Next, in response to a second mode change event (step 908), the access control 16 changes from the fast mode to a medium mode or, for example, once a second (step 910). In this embodiment, the second mode change event may include, but not be limited to, responding to a determination of an average power threshold as multiple mobile devices may be identified by the access control 16.

The method for determining average power threshold can be performed by measuring coulombs used by a circuit over a time period=C. Average power used=C/(Total time)=average power used by advertising. Alternatively, determining average power threshold can be performed by measuring the time in various modes and calculating average power usage: (X*time in fast mode+Y*time in medium mode+Z*time in slow mode)/(total time)=average power used by advertising.

In one example, the average power threshold is reached to identify that too much energy has been used at the fast mode, to drop down to the medium mode to reduce power usage. This may be done, for example, to guarantee at least a minimum battery life. Alternatively, the average RSSI values of the scan responses are monitored such that the medium mode is switched to if the average RSSI for a scanner is greater than a minimum value. This limits the distance that the mobile device is from the access control 16 before the faster advertising rate becomes active.

Next, in response to a third mode change event (step 912), the access control 16 changes from the medium mode to the slow mode (step 914). In this embodiment, the third mode change event may include, but not be limited to, a timeout period, and/or an access control 16 open event. Further, the RSSI limit may be removed allowing all scan request to trigger the fast advertisement rate.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms “a,” “an,” “the,” and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

The invention claimed is:

1. A method of dynamically changing a mode of advertising, comprising:

transmitting advertisements from an access control according to a nominal mode;

changing the nominal mode in response to an event;

changing to a medium rate between the nominal rate and a fast rate after a time period subsequent to the event, prior to reverting to the nominal rate after a time period subsequent to the event; and reverting to the medium or nominal rate after comparing a calculation of average power consumption with a threshold.

2. The method as recited in claim 1, wherein changing the nominal mode in response to the event includes changing the advertisement rate.

3. The method as recited in claim 1, wherein the event is based on a scan request.

4. The method as recited in claim 1, wherein changing the nominal mode in response to the event includes changing the nominal mode to a slower mode or a faster mode for a period of time in response to the event.

5. The method as recited in claim 1, wherein the event is based on a scan request and a comparison between an RSSI value and a threshold value.

6. The method as recited in claim 1, wherein changing the nominal mode in response to the event includes changing the nominal mode to a slower mode or a faster mode for a predefined period of time.

7. The method as recited in claim 1, further comprising reverting to the nominal rate after a time period subsequent to the event.

8. The method as recited in claim 1, further comprising reverting to the nominal rate after an access control unlock event.

9. The method as recited in claim 1, further comprising reverting to the nominal rate after a low battery event.

10. A method of dynamically changing a mode of advertising, comprising:

transmitting advertisements from an access control according to a nominal mode;

changing the nominal mode in response to an event, wherein the event is based on a scan request and a comparison between an RSSI value and a threshold value;

changing to a medium rate between the nominal rate and a fast rate after a time period subsequent to the event, prior to reverting to the nominal rate after a time period subsequent to the event; and monitoring an average RSSI values of the scan responses such that the medium mode is switched to if the average RSSI is greater than a minimum value.

11. The method as recited in claim 10, wherein the event is based on a scan request.

12. The method as recited in claim 10, wherein changing the nominal mode in response to the event includes changing the nominal mode to a slower mode or a faster mode for a predetermined period of time in response to the event.

13. An access control system, comprising: an access control operable to transmit advertisements at a nominal rate and at least one other rate different than the nominal rate in response to an event;

wherein charging the nominal rate includes changing to a medium rate between the nominal rate and a fast rate after a time period subsequent to the event, prior to reverting to the nominal rate after a time period subsequent to the event; and reverting to the medium or nominal rate after completing a calculation of average power consumption with a threshold.

14. The system as recited in claim 13, wherein the rate is selected in response to an event related to an RSSI value.

15. The system as recited in claim 13, wherein the rate is selected in response to an event based on a scan request.

16. The system as recited in claim 13, wherein the advertisements using Bluetooth low energy (BTLE) that is receivable by a mobile device.

* * * * *